Figure 10:
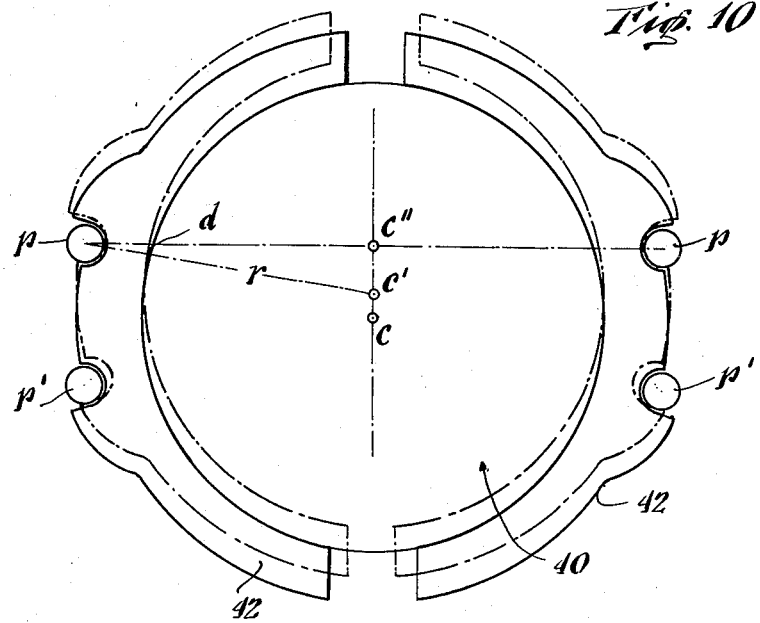

Oct. 2, 1951 P. S. MORGAN 2,569,533
DIFFERENTIAL
Filed March 12, 1949 3 Sheets-Sheet 1
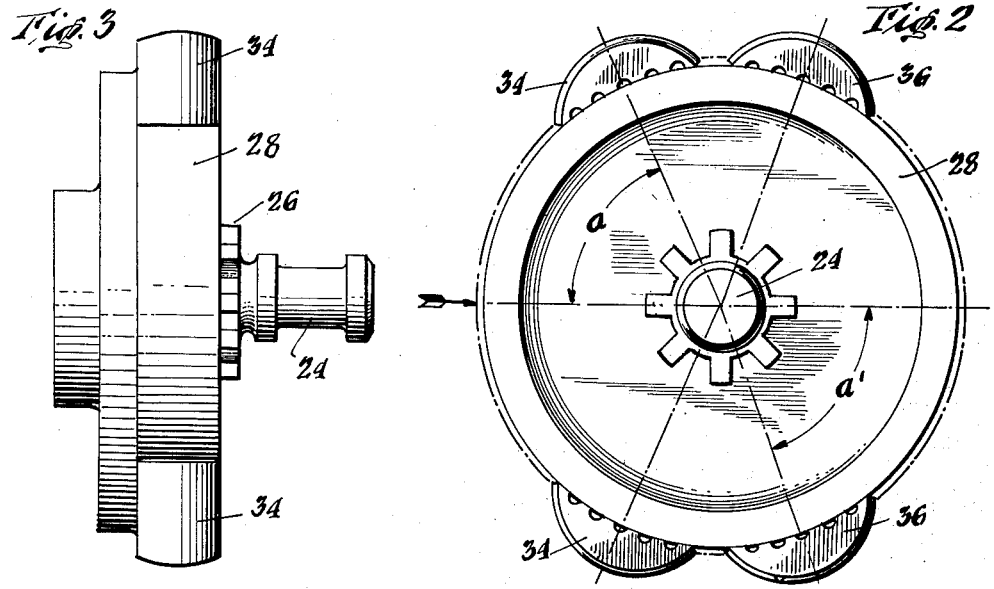
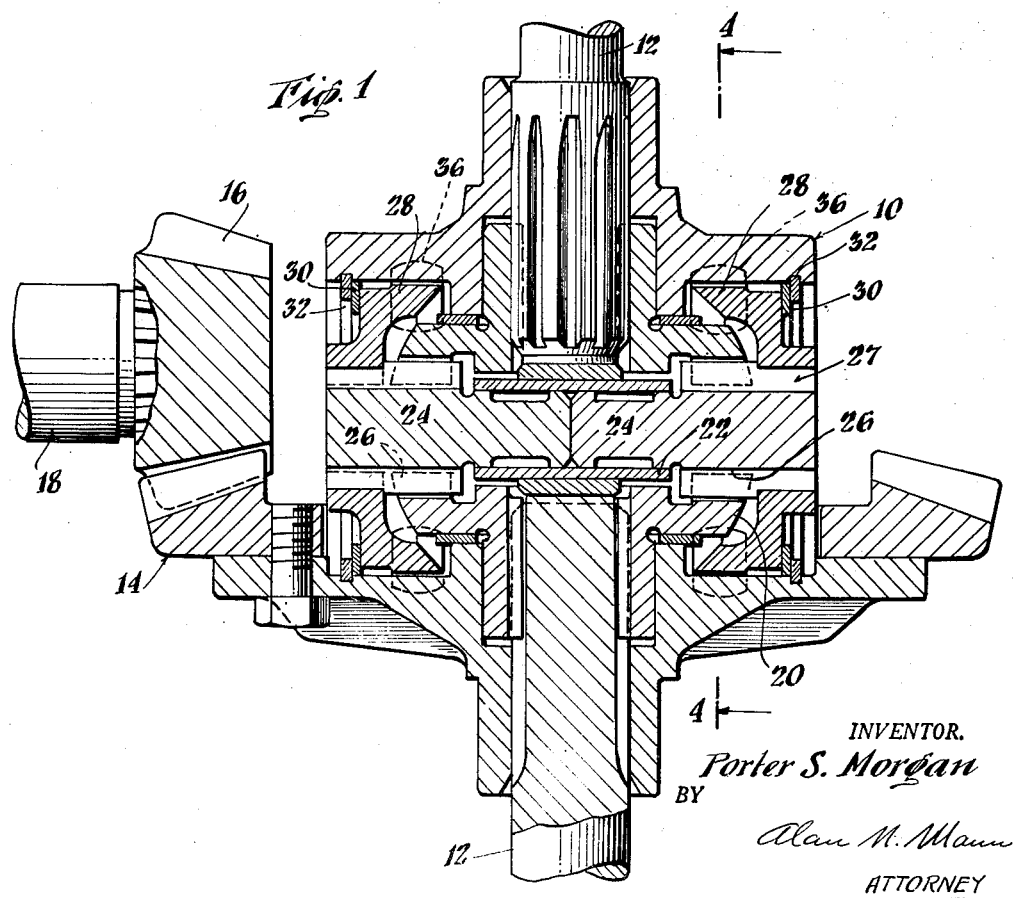
INVENTOR.
Porter S. Morgan
BY
Alan M. Mann
ATTORNEY

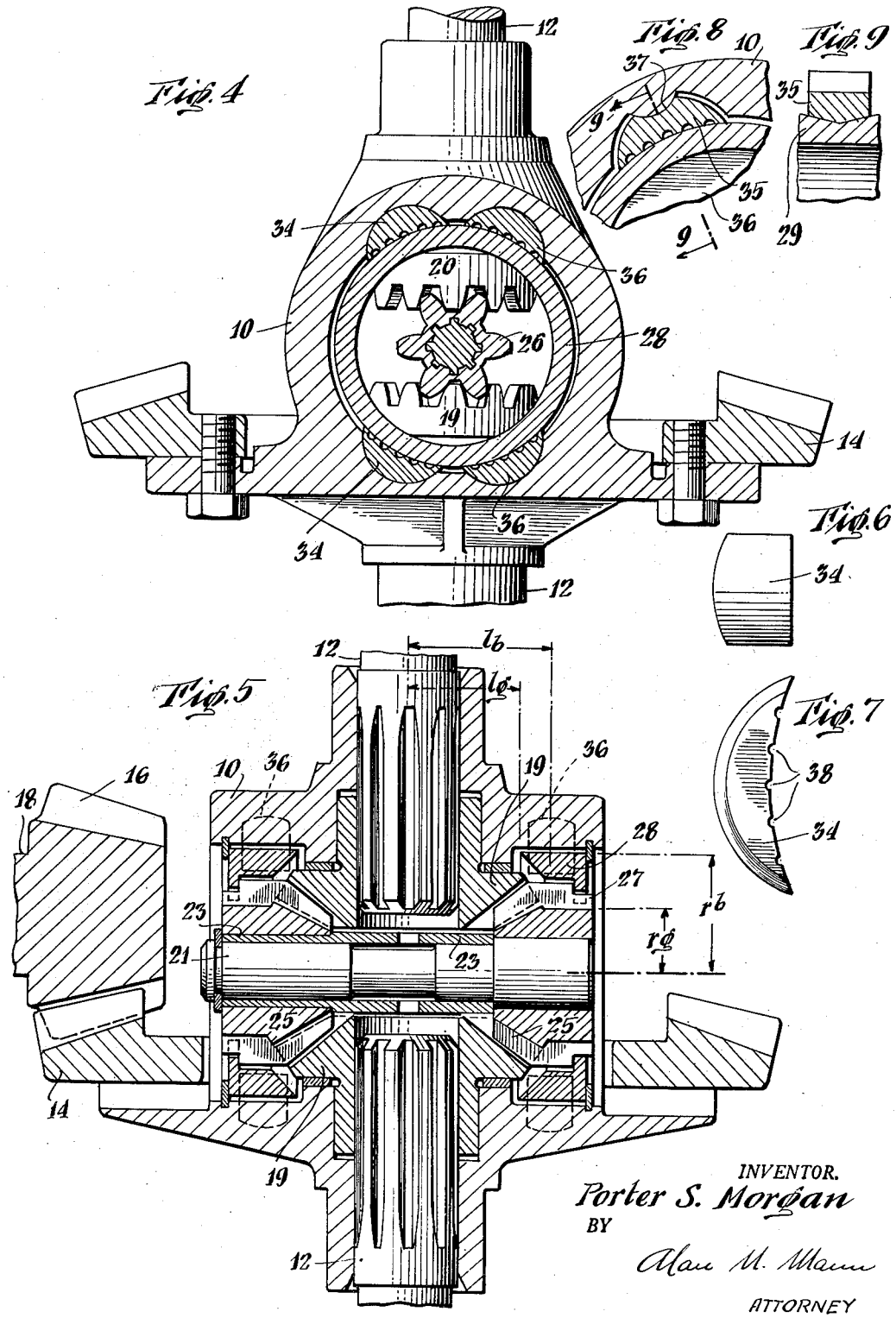

Oct. 2, 1951  P. S. MORGAN  2,569,533
DIFFERENTIAL

Filed March 12, 1949  3 Sheets-Sheet 3

INVENTOR.
Porter S. Morgan
BY

ATTORNEY

Patented Oct. 2, 1951

2,569,533

UNITED STATES PATENT OFFICE 2,569,533

DIFFERENTIAL

Porter S. Morgan, Westport, Conn.

Application March 12, 1949, Serial No. 81,121

8 Claims. (Cl. 74—711)

This invention relates to differentials for automobiles or the like, and the object of the invention is to produce a differential which will permit the wheels to operate at different speeds but which will not permit one of the wheels to spin freely when the resistance to that wheel is greatly reduced.

The standard differential employed today comprises two axle shafts each carrying a differential gear. Epicyclic pinion gears are positioned between these axle gears and a driving member is so arranged that its force is transmitted to the pinion gears. Attempts have been made over the course of years to solve this problem by imposing a braking action on the pinion gears. Such braking action should have a relationship to the driving force imposed and in order to be effective, the braking action has to be very great.

I solve this problem by supplying each of the pinion gears with a brake drum surface through which the driving force is applied. Instead of transmitting this driving force to the brake drum in the line which passes through the axis of the brake drum (that is in the line of the maximum direct pressure) I supply a pair of brake shoes which are positioned around toward the sides of the brake drum and I transmit the driving force through these brake shoes. By having these shoes positioned around on the sides, a wedging action or multiplied leverage is had which very greatly increases the braking effect.

The position of the brake shoes relative to the brake drum can best be defined in terms of the angle between the line of thrust from the driving member and a radius from the center of the brake drum to the center line of pressure of the brake shoes. As will be brought out later, this angle is important and should fall within limits hereinafter defined.

With a properly designed brake drum and brake shoe arrangement (as hereinafter described) it is possible to arrange a differential which will permit the wheels to rotate at different speeds when both have traction but which will exert enough frictional force so that if one of the driving wheels is jacked up or is on very slippery ice, it will lock out, and all of the force will be exerted through the outer wheel. Ordinarily I find it advisable not to go to this extreme and to exert a braking action which is very substantial but which is less than enough to lock the wheel which is carrying no load. Within the limits given herein, the designer can arrange for the particular effect which he wishes to produce.

In carrying out the invention it may be found desirable to use two pair of brake shoes, one pair to function during normal driving and the other pair to function when the gears are in reverse or when the engine is being used as a brake to slow down the progress of the vehicle. In such case the critical angle of the two sets of brake shoes may differ. For example, it may be advantageous to have a relatively low braking action exerted by the pair of brake shoes that is in operation during forward driving and to have a much greater braking action exerted by the brake shoes acting in reverse.

In addition to its function as a differential in axles, this device is also useful as a differential for other purposes, as for example it may be employed as a transfer box differential between the front and rear axles where a four-wheel drive is employed.

While the standard differential ordinarily employs bevel gears and while my device can be employed with such bevel gears, I find that for some purposes it is advantageous to use face or crown gears on the axle shafts and to use spurs as mating pinions.

This invention can best be understood by reference to the accompanying drawings which show illustrative examples of the invention.

Figure 11:
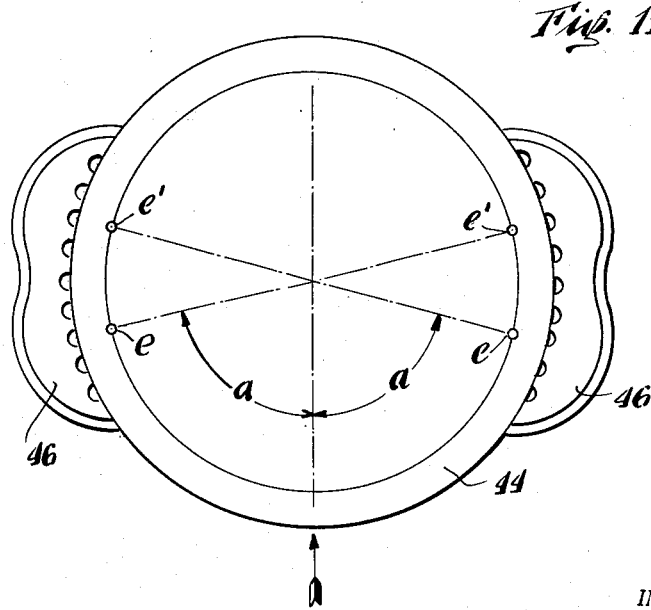

In these drawings, Fig. 1 shows a horizontal section through the transmission housing in a device using face gears; Fig. 2 is an elevation showing a brake drum, with its associated shoes and with the position of the rotatable support indicated. Fig. 3 is a side elevation of one of the brake drums with the brake shoes in place. Fig. 4 is a section on line 4—4 of Fig. 1; Fig. 5 is a view corresponding to Fig. 1 but showing the use of bevel gears instead of face gears; Fig. 6 is an end view and Fig. 7 a side elevation of one of the brake shoes; Fig. 8 shows a modification; Fig. 9 is a section on line 9—9 of Fig. 8; Fig. 10 is a diagrammatic view somewhat similar to Fig. 2 but showing a modification and Fig. 11 is a similar view showing a further modification.

In the drawings, the numeral 10 indicates the usual differential support which rotates as a whole around the axis of the collinear axle stub shafts 12. The bearings in which these shafts rotate are conventional and are not shown in these drawings. The driving mechanism is also conventional and consists of a bevel gear 14 carried by the differential support 10 and the bevel gear 16 carried by the drive shaft 18.

In the embodiment shown in Figs. 1 and 4, each of the stub shafts 12 has splined to it a face gear 20 which is journalled to rotate with its accompanying shaft within the rotatable support 10. A plug 22 is interposed between the ends of the stub shafts 12 and is provided with a transverse hole to receive the shafts 24 which carry the epicyclic spur pinion gears 26 that cooperate with the face gears 20. Each of the spur pinion gears 26 has a hub 27 to which is splined an associated brake drum 28, so that each of the pinion gears 26 and its accompanying brake drum 28 operates as an integral member.

A slight clearance is provided between the brake drums 28 and the rotatable support 10 and four crescent-shaped brake shoes 34 and 36 are positioned between the support 10 and each of the brake drums 28. The position of these brake shoes is clearly shown in Fig. 2 and is also indicated in Fig. 3. Fig. 2 is intended to illustrate the relative positions of the brake drum and its associated shoes. The support 10 is indicated in dot and dash lines. As shown in Fig. 1 the shafts 24 and their accompanying pinion gears 26 and brake drums 28 are held in the assembly by the bearing members 30 and the lock rings 32 which are of conventional design.

In Fig. 5 the stub shafts 12 have splined to them bevel gears 19. A single shaft 21 runs through the center of the device and carries bearing rings 23.

The shaft 21 carries the epicyclic bevelled pinion gears 25 which cooperate with the bevel gears 19. As before, each of the pinion gears 25 has a hub 27 to which is splined an associated brake drum 28 so that each of the pinion gears 25 and its associated brake drum 28 operate as an integral member.

When the shaft 18 is rotated, the rotatable support 10 rotates about the axis of the stub shafts 12. The arrow in Fig. 2 indicates the direction of rotation for forward movement, and of course when the car is in reverse, the pressure is in the opposite direction. The rotary motion of the support 10 will be transmitted through a pair of brake shoes, as at 34, to each of the brake drums 28, thus exerting a thrust tending to rotate stub shafts 12. In other words the rotatable support 10 is the driving member of the differential.

As shown in Fig. 2, the brake shoes 34 are well around on the sides of the brake drum instead of being in the line of direct pressure. This causes a wedging action to take place between each pair of brake shoes and their brake drum which will set up a heavy grip on the brake drums particularly under static conditions. When the car is being driven forward, with the load on the stub shafts substantially equal, the brake shoes 34 will keep the brake drums 28 locked and the stub shafts will be driven at an equal speed. If there is a momentary difference in load on the stub shafts, the static friction will not be overcome and the stub shafts will continue to rotate at even speed. However, if a difference in load on the two stub shafts continues, the friction between the brake shoes 34 and the brake drums 28 is not sufficient to keep the brake drums locked in place, and the stub shafts will be permitted to rotate at different speeds.

Thus when the car starts to turn, the kinetic energy ends to cause the outer wheel to rotate more rapidly than the inner wheel. This varies the load or thrust of the teeth on the pinion gears 26 relative to the face gears 20 and the effect of this change is to cause a movement of the effective fulcrum point about which the pinion gears operate. Some movement of the pinion gears is permitted and the movement of the fulcrum point causes an increased thrust on the inner wheel and at the same time causes an increase of speed on the outer wheel. This is the desired condition during normal differentiation.

If the load on one wheel is greatly reduced, as where one wheel rests on ice when the car is being started, the friction between the brake shoes 34 and brake drums 28 will prevent the wheel having the lesser load from spinning. It may either rotate slowly or be substantially locked in place, depending on the design of the apparatus. In any event, a substantial torque will be transmitted to the wheel under load particularly under the static friction conditions that govern when power is first applied.

One of the most important factors in this design involves the position of the brake shoes around on the sides of the brake drums, since the further around on the sides that they are positioned, the greater is their leverage or wedging action and the greater the friction between the brake shoes and the brake drums.

The wedging action of the brake shoes is best illustrated in Fig. 2 which shows the relationship of the brake shoes 34 and 36 relative to a brake drum 28. In this figure the position of the support which carries the brake shoes is indicated in dot and dash lines. An arrow indicates the line of force transmitted by the support during normal forward driving, though the parts are shown at rest, that is, with the brake drum centered in the casing as if no driving force were being exerted.

It is to be noted that each of the brake shoes 34 or 36 is of an arcuate shape and it is understood that a similar recess is formed in the support 10. There is some clearance between the support 10 and the brake drum 28 and the brake shoes project out of the support slightly so that they will approximately contact with the drum. When a force is exerted in the direction indicated by the arrow in Fig. 2 this will tend to rock the brake shoes 34 in their arcuate sockets about the centers of curvature of these sockets as fulcrum points, and this rocking or equalization will cause these shoes to exert a squeezing pressure against the sides of the drum 28. In this figure the angle between the line of force exerted by the support 10 (indicated by the arrow) around to the radius running to the center of the fulcrum points of the brake shoes 34 is designated as $a$. The reverse angle from the line of thrust (but in the opposite direction) to the radius running to the fulcrum points of the brake shoes 36 is designated as $a'$. It is evident that the larger this angle will be the greater will be the squeeze on the sides of the brake drum. For example in this figure the angle $a'$ is greater than the angle $a$ and this means that a greater squeezing action will be had when the car is in reverse than when the car is moving forward (the force exerted in the direction of the arrow). From this it follows that if there is a tendency for one wheel to slip, with this arrangement a greater torque will be transmitted to the wheel under load when the car is in reverse than when the drive is forward. At the same time, normal differentiating can take place more easily when the car is being driven forward. My investigation shows that in an ordinary axle the angle $a$ or $a'$ should not be less than 60° nor more than 82°. If the angle $a$ is less than 60° it will be found that for ordinary proportions of the brake drums and pinion gears one cannot get sufficient braking action on the drum 28 to give the desired torque to the wheel under load (unless other proportions are unusual as later brought out), whereas if it is greater than about 82°, there is danger that the parts will lock in place and no differentiating will be had. Actually, an arrangement with angle $a$ equal to about 70° is satisfactory when other conditions are proper. Another way of expressing the desired angle is to say that the angle between the two radii running to the center lines of the fulcrum points of a pair of brake shoes (that is the angle equals $2a$) should be between 120° and 164°, and a good working value is that this angle should be about 140°.

I have found that the relationship between certain other dimensions in the design is also of considerable importance. In Fig. 5 the effective pitch cone mean radius of the pinion gear (which in this figure is a bevel gear) is designated as $r_g$. The corresponding radius of the brake drum is designated as $r_b$. The distance from the center axis of the axle shafts to the effective thrust line of the pinion gears is designated as $l_g$ and the corresponding distance to the center line of the brake drum is designated as $l_b$. These dimensions are applied to Fig. 3 rather than Fig. 1 because in Fig. 1 the corresponding dimensions $l_g$ and $l_b$ are substantially equal.

A design factor of some importance which I call K is defined as follows:

$$K = \frac{\frac{r_b}{l_b}}{\frac{r_g}{l_g}}$$

that is, K equals the ratio of the brake drum radius divided by the length of the hub from the axle center to the brake drum center; to the gear force pitch radius divided by the length of the hub from the axle center to the gear force line. Simplified this formula becomes:

$$K = \frac{r_b l_g}{r_g l_b}$$

The larger that K can be made, the more the torque division between the wheels can be effective. This means that it is important to maintain the diameter of the brake drum large relative to the diameter of the pinion gear and it is important to keep the distance from the axle axis to the center line of the brake drum as small as possible relative to the distance from the axle axis to the gear force location. In practice I have found that it is possible to make the diameter of the brake drum larger than the diameter of the gear force pitch, whereas usually factors of design demand that the distance out to the brake drum radius be somewhat greater than the distance out to the gear force line. As previously stated this increment should be as small as possible.

Due to structural limitations I have found that it is difficult to design a device in which K has a value greater than 2, and I have found that to obtain effective results, K should have a value of at least 1.2. In general, it is somewhat easier to obtain a higher value for K using face gears than using bevel gears. It may be stated as a practical matter that K as herein defined should have a value between 1.2 and 2 and it may be pointed out that when the value of K is high, the angle $a$ may be toward the lower end of the stated range. If particular structural conditions permit the value of K to be raised to 2 or slightly above, there is no objection, and if the value of K should be high enough, the value of angle $a$ might be even less than 60° and still give valuable results.

Another factor of importance is the coefficient of friction between the brake shoes 34 and 36 and the brake drums 28. I have found that a proper coefficient of friction can be had and good wearing qualities provided when the face of the brake shoes and the face of the brake drums are nitrided. It is also advantageous to put transverse grooves in the brake shoes as indicated at 38 in Fig. 7, as these grooves will tend to prevent the building up of an oil wedge which will reduce the frictional effect.

In Figs. 6 and 7 the brake shoes 34 are formed with their outer surface arcuate in shape, so that they will rock or oscillate in the casing 10. Another form of brake shoe is shown in Fig. 8. Here the shoe 35 has a large transverse groove 37 formed in its back surface to rock around a corresponding projection formed on the inside of the casing 10. However having the pivot at this point is less desirable than where it falls within the periphery of the brake drum. In this figure another modification is shown in that the face of the brake drum 29 is formed in the shape of a shallow V and the face of the brake shoe is shaped to conform with it. These merely indicate some of many variables that may be made in the shape of the brake shoes and still have them capable of rocking or oscillating to give the desired squeezing action on the brake drums.

Another factor that must be taken into account is the closeness of fit of the brake shoes relative to the brake drums. It must be borne in mind that the wedging action which is the basis of this invention, results from the fact that the pair of brake shoes which are operating at any particular moment have their centers of pressure or pivot points short of the center line of the brake drum. That is, the angle from the line of thrust around to the radius running out to the center of pressure is less than 90° (I have recommended not over 82°). As the turning movement of the support pushes the brake shoes further around on the brake drum toward its full diameter, the brake shoes are pushed apart and the wedging action results.

If the pivot points of the brake shoes are positioned on a radius as much as 82° from the line of thrust and if the brake drum is, for example, about 2½ inches in diameter, a computation will show that even if the parts have a tight fit, the maximum theoretical squeezing movement on the brake drums will be only about 1/100 of an inch on each, when the full diameter of the brake drum comes in line with the pivot points of the brake shoe. Beyond this dead center, pressure will fall off.

Taking into account the clearances that must be had in order to fit the pieces together and the elasticity of material under the enormous pressures that may develop, as well as the possibility of wear, this means that if the angle were any greater than 82° the workmanship would have to be so accurate as to make the cost prohibitive and even if the device were built, the wedging would be such as to risk freezing and the pressures might be too great. The rule may be stated that in any event the clearances must be so small that in the limited movement permissible to the brake drums within the support, the wedging action must at all times be exerted on the brake shoes in such a way as to exert pressure along the lines of the radii running through their centers of pressure which in the case of rocking brake shoes will run substantially through their pivot points; and the angle between these radii must never equal 180° after taking into account all clearances, compressibilities and the like. In this connection it may be noted that at least in theory the brake shoes may be formed integral with the support instead of having them so constructed that they will rock. This, however, would not permit of equalizing wearing surfaces and the rocking brake shoes are much more advisable.

The length of the brake shoes is not critical as they can swing around their pivot points as desired but a large area is desired as pressures of as much as 15,000 pounds per square inch or more may be developed. The absolute limit of clearance is that the minimum distance between the brake shoes measured along a line passing through their pivot points must never be as great as the diameter of the brake drum.

This is illustrated diagrammatically in Fig. 10 which is included primarily for the purpose of discussing the theory of operation. In this figure, the brake drum 40 has a center point $c$. Two brake shoes 42 largely surround this brake drum and are pivoted so that they will rock about the pivot points $p$. If the center point $c$ is now moved relative to the pivots $p$ so that it assumes the position $c'$, the brake shoes 42 will tend to take the positions shown in broken lines. However, in order to take these positions, there will be an outward thrust against the pivots $p$ whose maximum effect is equal to the distance between the broken line and solid line marking the periphery of the brake drum on the radius $r$ running from the center point $c'$ to the pivot point $p$. This distance is indicated at $d$. If the parts are made sufficiently accurately so that the brake shoes cannot move out this distance, then the brake drum will jam between the shoes before the center $c$ can reach the position $c'$.

It is obvious that if the clearances are such as to permit the center point $c$ to move up to the position indicated at $c''$, the wedging action will cease and there will be nothing to interfere with further movement of this center point. In other words, the device would pass beyond the absolute permissible limit.

It will be noted that in the form illustrated in this figure, the shoes 42 run largely around the brake drum 40. In such case two separate pivot points can be supplied for each brake shoe. For example, if pivots $p'$, as well as pivots $p$, are also supplied, then the same brake shoes will function for thrusts either forward or in reverse.

It is not suggested that Fig. 10 shows a desirable form of construction, as this figure is intended primarily to illustrate some of the mechanical principles involved in my invention. While this construction is operative if properly proportioned as to clearances and the like, in this case the brake shoes are needlessly long and here the pivot points, like those of Fig. 8, fall in an area outside the periphery of the brake drum. This is not the most desirable form, as in such case the brake shoes are in an unstable state and this may tend to cause jamming.

A simpler form of device involving only a single pair of brake shoes which serve for both forward and reverse forces is shown in Fig. 11. Here the drum 44 is provided with two brake shoes 46 each having two arcuate portions formed around the pivot points $e$ and $e'$ respectively. When the thrust of the support is in the direction indicated by the arrow, the wedging tending to force the shoes apart will be approximately along the lines of the radii passing through the points $e$. When the thrust is in the reverse direction, the wedging force will be along the radii passing through the points $e'$. By thus combining two shoes into a single member a larger effective braking area can be had for a given value of the angle $a$. For example, in this figure the angle $a$ is about 75° which is large enough to cause the braking force to exert a great strain on the casing.

In the examples shown I have illustrated the best mode in which I have contemplated applying the principles of my invention, but it is understood that the same may be modified in many particulars and still employ the invention which I have made.

What I claim is:

1. In a differential of the type in which driving force is transmitted to two collinear shafts by the pinions of an epicyclic gear train, an epicyclic gear in such train, a brake drum rotating with such gear, a rotatable driving member, and a pair of braking surfaces carried by such rotatable member adapted to cooperate with such brake drum to transmit the driving force to such epicyclic gear, said braking surfaces being so positioned that they will contact such brake drum toward the sides thereof with the angle between the radii leading from the axis of the brake drum to the centers of pressure of the braking surfaces being between 120° and 164° whereby a wedging action is obtained.

2. A structure as specified in claim 1 in which the mean diameter of said brake drum is greater than the thrust diameter of the epicyclic gear.

3. A structure as specified in claim 1 in which the epicyclic gear train comprises face gears.

4. In a differential of the type in which driving force is transmitted to two collinear shafts by the pinions of an epicyclic gear train, an epicyclic gear in such train, a brake drum rotating with such gear, a rotatable driving member, and a pair of brake shoes on opposite ends of such brake drum and adapted to cooperate therewith, said shoes being carried by said rotatable member and adapted to pivot in said member, the angle between radii running from the axis of the brake drum through the pivot points of said brake shoes being between 120° and 164° and the minimum distance between said brake shoes measured along a line passing through their pivot points being less than the diameter of said brake drum.

5. A structure as specified in claim 4 in which the pivot points of the brake shoes fall within the area of the brake drum.

6. A structure as specified in claim 4 which further includes a second pair of such brake shoes for transmitting the driving force from such rotatable member to the epicyclic gear in the reverse direction to that transmitted by the first pair of such brake shoes.

7. In a differential of the type in which driving force is transmitted to two collinear shafts by the pinions of an epicyclic gear train, an epicyclic gear in such train, a brake drum rotating with such gear, a rotatable driving member, and a pair of brake shoes on opposite sides of such brake drum and adapted to cooperate therewith said brake shoes being carried by said rotatable member and being adapted to pivot therein, each of said brake shoes having two pivot points and the angle between radii running from the axis of the brake drum through two nearest pivot points of respective brake shoes being between 120° and 164°.

8. A differential comprising a rotatable member, axle shafts, gears carried by such axle shafts and epicyclic pinion gears between such axle shaft gears, a brake drum mounted to rotate with each pinion gear and a pair of wedging brake shoes carried by the rotatable member and adapted to contact each brake drum, the angle between the radii running from the axis of the brake drum to the centers of pressure of each of the brake shoes being between 120° and 182° and in which the relationship of parts of the device is such that K has a value of between 1.2 and 2 in the formula:

$$K = \frac{r_b l_g}{r_g l_b}$$

in which $r_b$ is the radius of the brake drum, $r_g$ is the effective radius of the pinion gears, $l_g$ is the length of the hub of the pinion gear from the axis line of the axle shafts to the plane of the thrust line of the pinion gear and $l_b$ is the length of such hub from the axis line of the axle shafts to the plane of the center line of the brake drum.

PORTER S. MORGAN.

REFERENCES CITED

The following references are of record in the file of this patent:

UNITED STATES PATENTS

| Number | Name | Date |
|---|---|---|
| 1,620,246 | Walter | Mar. 8, 1927 |
| 2,064,152 | Conboy | Dec. 15, 1936 |
| 2,234,592 | Fitzner | Mar. 11, 1941 |
| 2,283,661 | Williamson | May 19, 1942 |
| 2,305,092 | Lawrence | Dec. 15, 1942 |
| 2,415,293 | Le Tourneau | Feb. 4, 1947 |